United States Patent Office 2,972,789
Patented Feb. 28, 1961

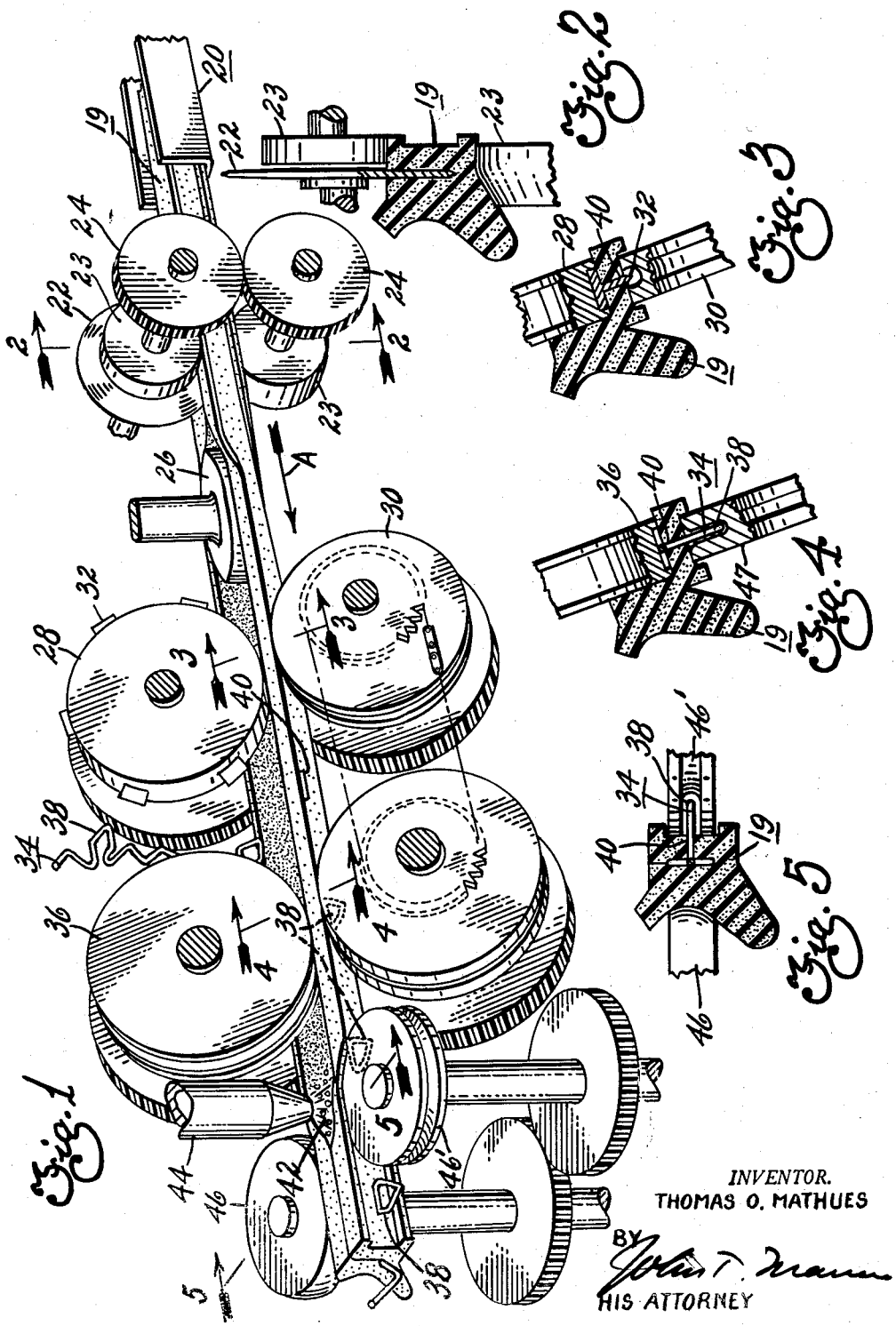

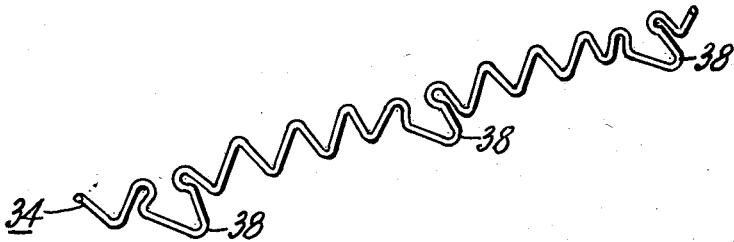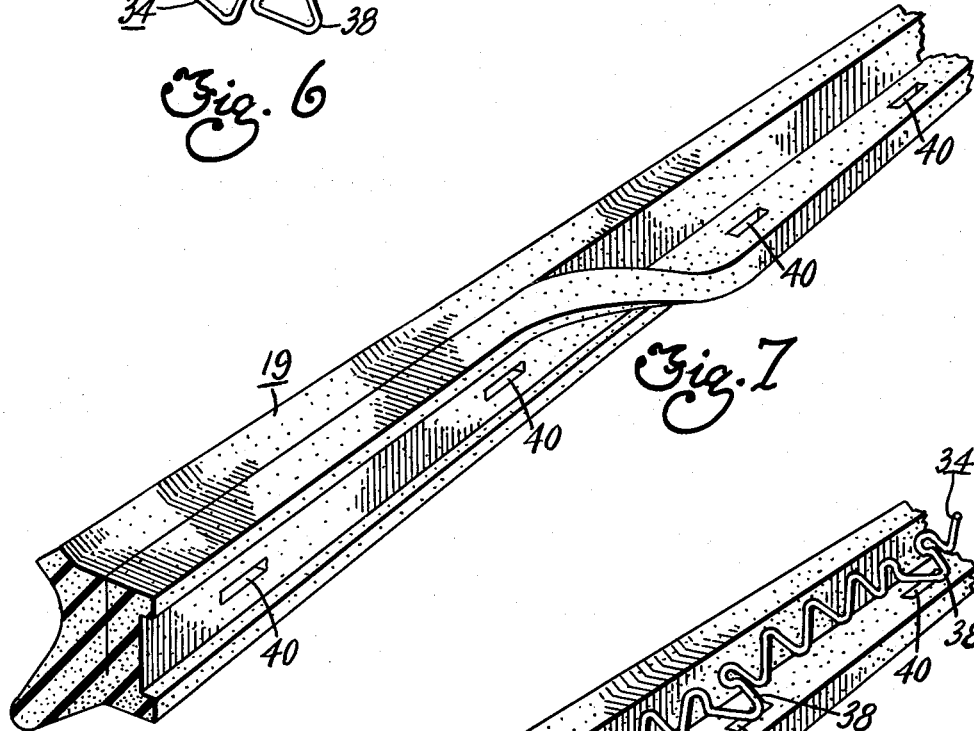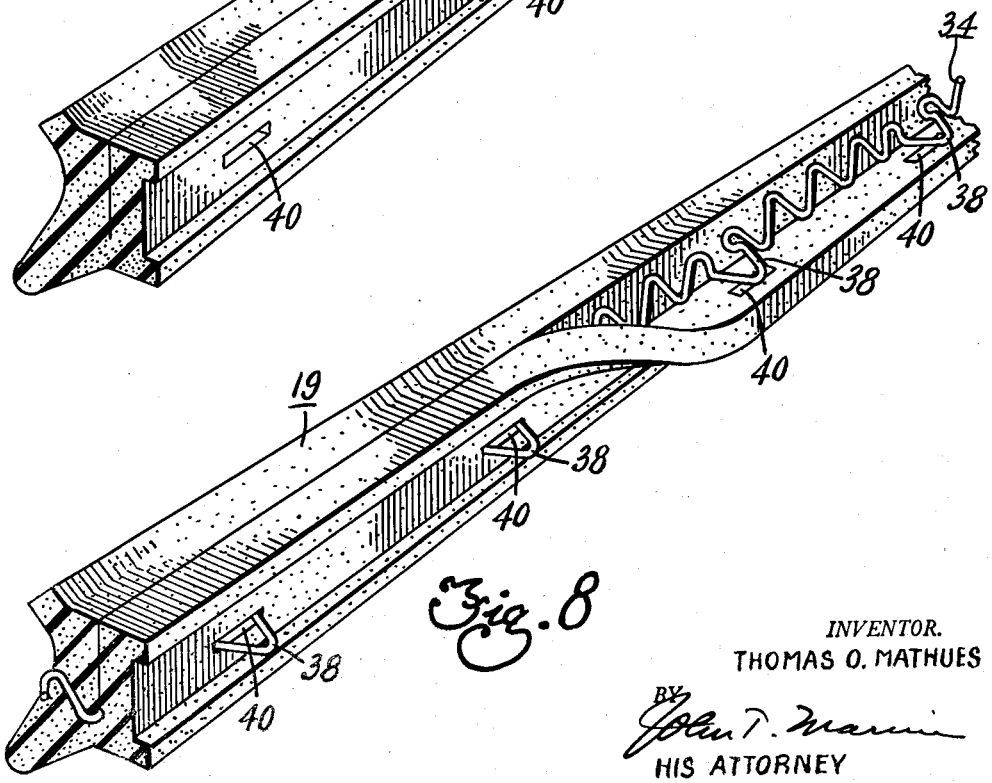

2,972,789
SEALING STRIP AND METHOD OF MANUFACTURING SUCH STRIP

Thomas O. Mathues, Dayton, Ohio, assignor to General Motors Corporation, Detroit, Mich., a corporation of Delaware Filed Nov. 6, 1959, Ser. No. 851,371

8 Claims. (Cl. 20—69)

This invention relates to sealing strips and is particularly concerned with a method for making sealing strips including elongated metallic reinforcing members therein.

Sealing strips for use with automotive bodies and the like present serious problems in the attachment thereof to prevent disassembly during use. The majority of these problems have been completely overcome by the development of a sealing strip as shown in Harris Patent 2,579,672, assigned to the assignee of the present invention. This strip is made of foamed rubber-like material and includes a reinforcing wire embedded therein which is extensible to permit minor variations in dimension and which includes, at predetermined points, attachment clips or fingers which extend outwardly of the strip and which may be engated in holes of a body member. These attachment members or clips firmly hold the strip in position on the body member whereby accidental disengagement thereof is prevented and where the strip is positioned functionally at all times.

Sealing strips of this nature present problems in the manufacture thereof wherein the extensible and elongated metallic wire and attachment means must be positioned in the mold and held therein as the foamed rubber-like material is filled into the mold and must be maintained in predetermined position with the mold until the foam sets or gels. In the case of blown sponge materials, the problem of positioning the wire reinforcement during the blowing portion of the curing cycle is made very difficult because of the relatively very high viscosity of the sponge material compared with foamed liquid latex. For example, if the sponge is sufficiently viscous and the wire of light gauge, the operation may be entirely impractical.

The present invention is directed to a strip similar to the strips shown in said Harris patent wherein the reinforcing wire or member is applied to the strip after the strip has been formed and vulcanized or set whereby the cost of manufacturing the strip is reduced and the entire operation is facilitated. It is understood, therefore, that the present invention may be used with foam, solid rubber-like sections or tubular stock.

It is, therefore, an object of this invention to provide a method for making an elongated sealing strip from rubber-like material which includes a reinforcing wire therein which reinforcing wire is applied to the strip after the material is set or vulcanized.

In carrying out the above object, it is a further object to produce elongate strip material and then to slit the material and substantially simultaneously perforate the same at spaced intervals whereby a reinforcing wire may be applied to the strip in the slit portion thereof with attachment means extending through the perforations.

Further objects and advantages of the present invention will be apparent from the following description, reference being had to the accompanying drawings wherein preferred embodiments of the present invention are clearly shown.

In the drawings:

Figure 1 shows diagrammatically a machine for making a sealing strip by the method disclosed herein.
Figure 2 is a view taken on line 2—2 of Figure 1.
Figure 3 is a view taken on line 3—3 of Figure 1.
Figure 4 is a view taken on line 4—4 of Figure 1.
Figure 5 is a view taken on line 5—5 of Figure 1.
Figure 6 is a fragmentary perspective view of one type of wire reinforcement which may be used in the strip.
Figure 7 is a view of the slit and perforated strip prior to insertion of the wire.
Figure 8 is a view in perspective of the strip showing the wire in position with a portion of the strip fully assembled and another portion of the strip in the process of being fully assembled.

Sealing strips made from solid rubber-like materials or fluid foamy material taken from the class consisting of natural rubber, rubbery butadiene styrene copolymers, rubbery butadiene acrylonitrile copolymers, rubbery neoprene materials, foamed resilient vinyls, resilient polyurethane foams or any other suitable material, are well known and form no part of this invention which is directed to the application of reinforcing wires to strip material.

Strip material 19 of the desired cross section is fed to a machine as shown at 20 in Figure 1. The strip 19 passes under a slitting cutter 22 which is driven at high speed by a motor (not shown) to slit the strip longitudinally as shown in detail and cross section in Figure 2. The strip is preferably driven by suitable pressure rolls 23, geared together by gears 24 which are in turn driven by a motor not shown. The slit strip then passes over a separator 26. The opened strip then passes between a notching roll 28 and a cooperating back-up roll 30. The notching roll has spaced cutters 32 which notch the strip in cooperation with the back-up roll 30 to provide longitudinal notches therein. This action is shown in more detail in Figure 3. The strip, still open, is then supplied with an elongate reinforcing wire 34 which passes under a roll 36 and is fed so that the attachment points or outstanding clip portions 38 thereof pass through perforations 40 previously made in the strip as noted in Figure 4. In this view, it will be seen that the one portion of the strip is held at about 90° from the other portion so that the clips 38 pass through the perforations 40 easily. After the strip passes the roll 36, it is preferable although not entirely necessary, to spray cement 42 therein from a nozzle 44 and thereafter the strip passes between pressure rolls 46 and 46′ to close the slit and press the sides thereof together whereby they are adhered through the action of the cement 42. The roll 46 and its back-up roll 46′ are shown in section in Figure 5. In all instances, since the several rolls are geared together and are driven, the strip moves or is pulled in the direction of the arrow A at all times whereby the strip is progressively operated upon and the wire is laid in position and cemented in place.

In Figure 6 of the drawings, a perspective view of the wire 34 is shown which is preferably of a zig-zag nature and has upstanding attachment clips 38 formed transversely to the zig-zags at predetermined spacing therealong. The strip 19 is shown in Figure 7 with the perforations 40 therealong. It will be noted that the slit is transverse to the axis of the clips 38 when they are in position and this is clearly shown in Figure 8 wherein the zig-zag portion of the wire lies in the slit and the clips 38 thereof pass outwardly through the perforations 40. Thus, when the slit strip is closed either by the use of cement or due to the inherent resiliency of the material, the clips are held to the strip by the interlocking action of the zig-zag wire in the slit portion whereby the wire cannot be disengaged easily from the strip after it is once put in place and the strip is assembled to the supporting member by which it is ultimately carried.

The method of forming strip by this process is obviously an improvement from the standpoint of cost and ease of procedure since it is easier to assemble a wire to the cured material than to hold the wire in place during the curing of the material. Furthermore, it is possible to utilize special reinforcing devices wherein different types of clips may be applied to different portions of the strip, for example, at the corner portions and this may be accomplished either by inserting a separate piece of wire with different attachments thereon or by prefabricating the reinforcing and welding different sections into the wire so that a custom type strip may be provided without the necessity of re-operating the elastomer portion of the strip as is done at the present time.

In general, the method disclosed herein reduces the cost and improves the versatility of the product.

While the embodiments of the present invention as herein disclosed constitute preferred forms, it is to be understood that other forms might be adopted.

What is claimed is as follows:

1. In a method for inserting a reinforcing wire having outstanding attachment points predeterminately spaced therealong in a performed elastomeric sealing strip, the steps of, slitting the strip longitudinally thereof and in a plane perpendicular to the plane in which the attachment points extend, perforating one side of the slit strip at spaced points wherein the spacing is substantially the same as the spacing of the attachment points on the reinforcement, inserting the reinforcement in the slit strip with the attachment points extending through the perforations, and then closing the strip.

2. The method as claimed in claim 1 including the added step of applying adhesive to the slit portion prior to the closing of the strip and then pressing the two surfaces of the strip together for adhering the two surfaces and for permanently closing the strip.

3. In a method for making a reinforced sealing strip having spaced attachment points extending outwardly therefrom, comprising, providing an elastomeric sealing strip, providing an elongate reinforcing member having attachment points extending outwardly therefrom at spaced intervals therealong, slitting the sealing strip longitudinally thereof and in a plane normal to the plane in which the attachment points normally extend, perforating one side of the slit strip at points spaced similarly to the spacing of said attachment points on said reinforcing member, progressively opening the slit, progressively passing the attachment points through the slits while simultaneously inserting the remainder of the reinforcement within the slit, whereby the attachment points extend through the slits and outwardly of the strip and finally progressively closing the slit.

4. The method as claimed in claim 3 including the added step of applying adhesive to the slit portion prior to the closing of the strip and then pressing the two surfaces of the strip together for adhering the two surfaces and for permanently closing the strip.

5. In a method for making a reinforced sealing strip having spaced attachment points extending outwardly therefrom, comprising, providing an elastomeric sealing strip, slitting the sealing strip longitudinally thereof and in a plane normal to the plane in which the attachment points normally extend, perforating one side of the slit strip, progressively opening the slit, progressively passing attachment points through the slits whereby the attachment points extend through the slits and outwardly of the strip and finally progressively closing the slit.

6. The method as claimed in claim 5 including the added step of applying adhesive to the slit portion prior to the closing of the strip and then pressing the two surfaces of the strip together for adhering the two surfaces and for permanently closing the strip.

7. A sealing strip, comprising in combination; a body portion having a base and a sealing lip extending therefrom in opposed relation to said base, a longitudinal slit partially severing the strip and extending therealong parallel to the base, said base having spaced perforations with their axes normal to the slit, and an extensible wire reinforcing element positioned with the slit and having spaced integral attachment points extending therefrom, said attachment points passing through said perforations and outwardly of the base of the strip whereby the strip may be mounted to a supporting member by said attachment points.

8. The sealing strip as claimed in claim 7 including an adhesive for permanently closing said slit.

References Cited in the file of this patent

UNITED STATES PATENTS

| | | |
|---|---|---|
| 2,579,072 | Harris | Dec. 18, 1951 |
| 2,720,685 | Harris | Oct. 18, 1955 |